US 6,704,576 B1

(12) United States Patent
Brachman et al.

(10) Patent No.: US 6,704,576 B1
(45) Date of Patent: Mar. 9, 2004

(54) METHOD AND SYSTEM FOR COMMUNICATING MULTIMEDIA CONTENT IN A UNICAST, MULTICAST, SIMULCAST OR BROADCAST ENVIRONMENT

(75) Inventors: Ronald J. Brachman, Westfield, NJ (US); Peter F. Driessen, Highlands, NJ (US); Evan S. Crandall, Basking Ridge, NJ (US); Steven L. Greenspan, Scotch Plains, NJ (US); Mathias Kretschmer, Jersey City, NJ (US); Schuyler Quackenbush, Westfield, NJ (US); Joseph B. Weinman, Jr., Basking Ridge, NJ (US)

(73) Assignee: AT&T Corp., New York, NY (US)

( * ) Notice: Subject to any disclaimer, the term of this patent is extended or adjusted under 35 U.S.C. 154(b) by 402 days.

(21) Appl. No.: 09/671,471

(22) Filed: Sep. 27, 2000

(51) Int. Cl.$^7$ ................................................. H04K 3/00
(52) U.S. Cl. ...................................... 455/503; 370/432
(58) Field of Search .................... 455/503, 45, 3.01, 455/517, 456.2, 422.1, 443, 444; 370/432, 705

(56) References Cited

U.S. PATENT DOCUMENTS

| | | | |
|---|---|---|---|
| 5,594,872 A | * | 1/1997 | Kawano et al. .............. 709/240 |
| 5,689,505 A | | 11/1997 | Chiussi et al. |
| 5,752,186 A | | 5/1998 | Malackowski et al. |
| 5,832,229 A | | 11/1998 | Tomoda et al. |
| 5,862,345 A | | 1/1999 | Okanoue et al. |
| 5,867,780 A | | 2/1999 | Malackowski et al. |
| 5,887,252 A | | 3/1999 | Noneman |
| 5,903,564 A | | 5/1999 | Ganmukhi et al. |
| 5,909,438 A | | 6/1999 | Melden et al. |
| 5,948,061 A | | 9/1999 | Merriman et al. |
| 5,983,005 A | | 11/1999 | Monteiro et al. |
| 5,991,298 A | | 11/1999 | Hunt et al. |
| 6,049,546 A | | 4/2000 | Ramakrishman |
| 6,360,076 B1 | * | 3/2002 | Segura et al. ............... 455/67.1 |
| 6,487,584 B1 | * | 11/2002 | Bunney ....................... 709/206 |
| 6,512,776 B1 | * | 1/2003 | Jones et al. .................. 370/432 |
| 6,526,580 B2 | * | 2/2003 | Shimomura et al. ........... 725/63 |

OTHER PUBLICATIONS

Internet pages entitled "Ericsson answers the call for MP3", from CNET.com, 1995–1999, 3 pages.

"Introduction to IP Multicast Routing", Stardust Technologies, Inc., 1995–1997, 12 pages.

George Xylomenos and George Polyzos, "IP Multicast for Mobile Hosts", , *IEEE Communications Magazine*, Issue 1, vol. 35, Jan. 1997, pp. 54–58.

J.P. Mysore and V. Bharghavan, "Performance of transport protocols over a multicasting-based architecture for Internet host mobility", *IEEE*, Catalog # 98CH36220, vol. 3, 1998, 1 page.

Internet pages entitled, "About the CAB", from Canadian Association of Broadcasters, www.cab–acr.ca, 1998, 2 pages.

(List continued on next page.)

Primary Examiner—Nay Maung
Assistant Examiner—Tu X Nguyen

(57) ABSTRACT

The invention provides a system and method in which users may join a communication mode such that the multimedia content received by the user is closely matched to a predefined profile. The content may be transmitted by unicast, multicast or radio broadcast. Moreover, depending on an individual's request(s) and that of other users in a network, a user may switch between a radio broadcast, multicast and unicast to meet the user's preferences based on a profile. Profile data may include content type, transmission quality, cost considerations, etc. The two-way nature of the system and method also enable a user to request and receive information and complete transactions.

150 Claims, 6 Drawing Sheets

OTHER PUBLICATIONS

Joseph F. McCarthy and Theodore D. Anagnost, "MusicFX: An Arbiter of Group References for Computer Supported Collaborative Workouts", ACM, 1998, pp. 363–372.

B. Quinn, Internet Draft entitled, "IP Multicast Applications: Challenges and Solutions", from www.ipmulticast.com, Nov. 1998, 15 pages.

Dr. A. J. Bower, "Digital Radio—A Revolution For In–Car Entertainment", Proceedings of NavPos Automative '98 Conference, Jun. 10, vol. 2, pp. 40–51.

Internet pages entitled "SMARTRADIO", from Radio Corporation of Singapore, www.res.com.sg/smartradio, 1999, 5 pages.

Internet page entitled "IP Multicast Technical Resource Center", from IP Multicast Initiative—Technology Central, www.ipmulticase.com, 1999, 1 page.

Jennifer Tanaka and Beth Kwon, article entitled "Can You Name The Tune?", Cyberscope section of *Newsweek*, Jun. 7, 1999, 1 page.

Neil Strauss, "The MP3 Revolution: Getting With It", The New York Times On The Web, Jul. 18, 1999, 5 pages.

Yuko Inoue, "Do Music And Mobile Phones Mix?", Reuters Online Canada, Sep. 30, 1999, 2 pages.

Announcement entitled "Business Wire", from 1999 Business Wire, Inc., Oct. 25, 1999, 1 page.

Internet pages entitled "SRS Labs and WWW.Com Establish Cross–Licensing Partnership to Deliver WOW™, SRS Labs' Powerful New Audio Enhancement Technology, to Millions of Internet Broadcast Listeners", from www.com-.Inc., 1999 (12 pages).

Jim Louderback, "Broadcast PC Audio to Your Home Stereo", from www.zdnet.com, Nov. 25, 1999, 2 pages.

Brad Cain, et al. "Internet Draft entitled Internet Group Management Protocol, Version 3", from www.ietf.org/internet–drafts, Nov. 1999, 39 pages.

Internet pages entitled "Digital Radio DAB: Digital Audio Broadcasting", from http://magi.com/~moted.com, date unknown, 8 pages.

Internet pages entitled "Frequently Asked Questions (FAQ) on the Multicast Backbone (MBONE)", from www.cs.columbia.edu, 1999, 10 pages.

Gerard Faria and Simon Mason, "DAB: Commercial DAB networks and the use of data services", date unknown, 10 pages.

Internet pages entitled "Multimedia Environment for Mobiles", from www.uk.infowin.org., 1999, 3 pages.

"ROD—Radio On Demand: User Access and Delivery", from http://lucy.uvic.ca/shaka, date unknown, 5 pages.

* cited by examiner

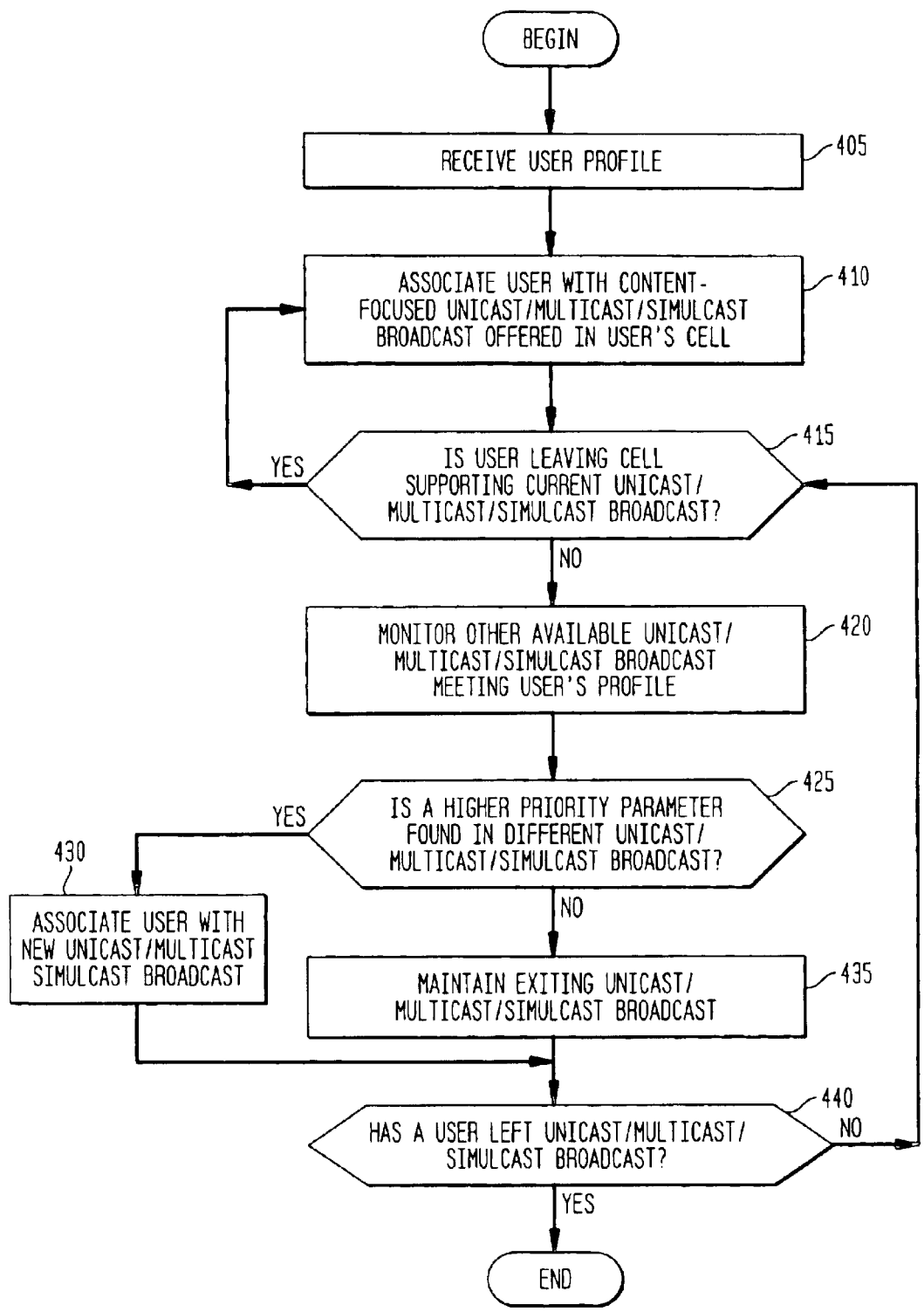

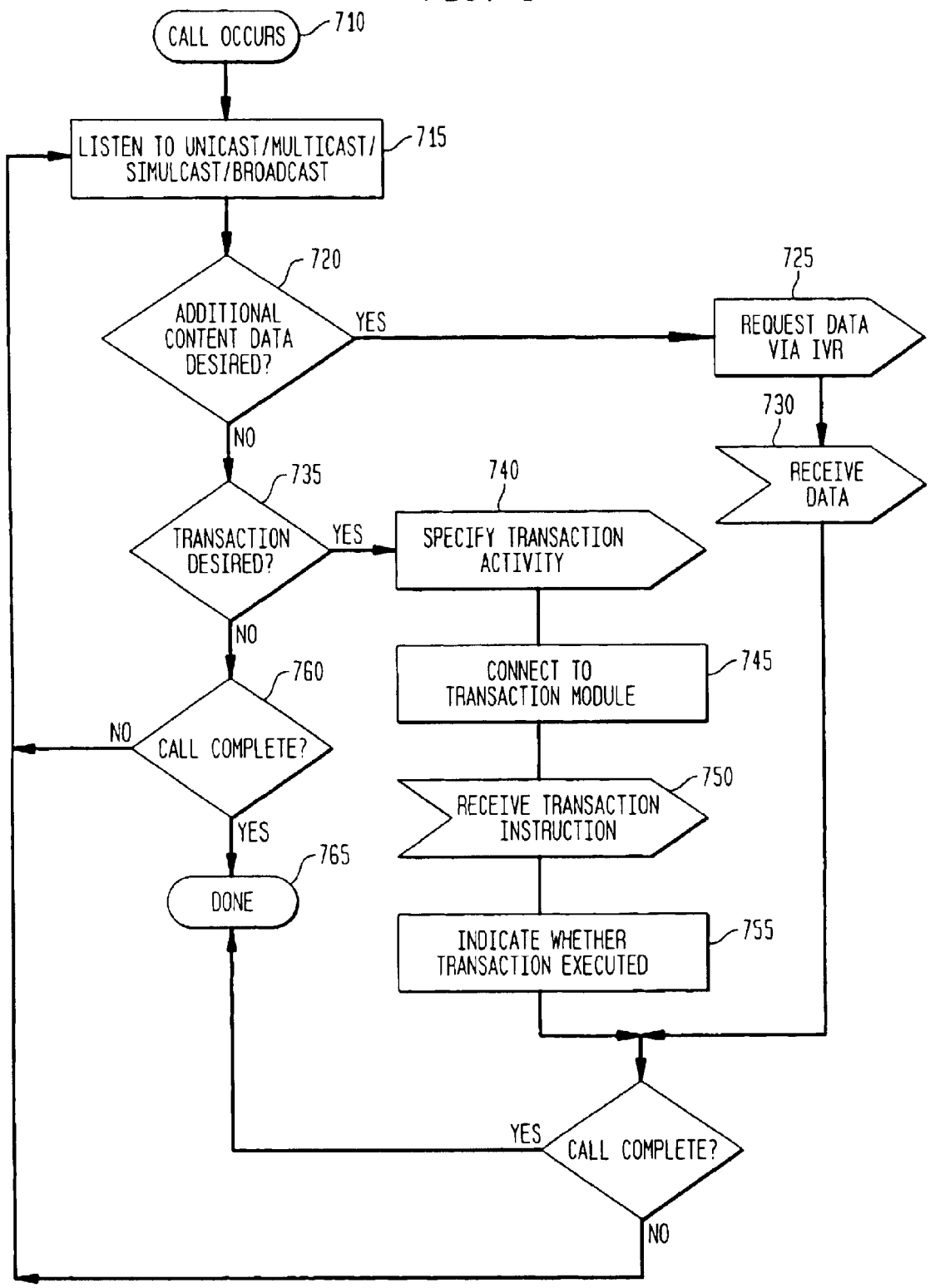

METHOD AND SYSTEM FOR COMMUNICATING MULTIMEDIA CONTENT IN A UNICAST, MULTICAST, SIMULCAST OR BROADCAST ENVIRONMENT

BACKGROUND OF THE INVENTION

1. Field of the Invention

The invention relates to multimedia telecommunications and more particularly to a method and system for communicating multimedia content in a unicast, multicast or broadcast environment.

2. Background Information

The current radio broadcast industry primarily depends upon broadcast towers to transmit signals to radios. According to FCC regulations, the frequency and amplitude of these broadcasts are strictly regulated such that different radio stations broadcast in different geographic regions, and the number of stations per region is governed through FCC licenses. Although radio broadcast can, at times, effectively transmit content to large audiences in a geographic region, and such a system may be accessed with ubiquitous devices and without incurring user subscription fees, such a system has various problems.

For example, the broadcasts are bound to moderately sized geographic regions, and the number of independent broadcasts is restricted by the licensed frequency spectrum. Thus, for AM and FM radio broadcasts, a traveler outside a given region cannot listen to broadcasts from that region (e.g., someone in New York City cannot listen in real time to a Los Angeles FM broadcast, except for syndicated programs). In addition, the broadcasts, do not provide coverage to very small regions (i.e., a broadcast that covers only a particular stretch of road).

Also, the number of independent stations in a given region is restricted to a relatively small number as current RF technology and licensed spectrum do not permit thousands of AM/FM radio stations per region. Moreover, the cost of broadcast to a region large enough to attract substantial advertising revenue is high, so that small specialized radio stations are often not able to attract sufficient revenues to invest in larger area broadcasts, and the larger radio stations often have to broadcast programs that have wide appeal. Further, current radio broadcast systems do not allow an individual listener to customize their listening experience so that a particular archived program can be listened to at the listener's convenience, and so that the listener can program a playlist that determines when and which broadcasts are heard by the listener.

Recently, radio stations have used the internet to broadcast programs via a multicast or unicast. These programs may be archived and presented on-demand or may be real-time continuously present programs. Some radio programs are broadcast through the internet and RF signals, some only through RF signals, and some only through the internet. Various devices have the capability of receiving radio broadcasts via cellular networks, including wired PCs as well as wireless devices such as cellular telephones and other handheld devices.

Unicasts, multicasts and broadcasts each have their own advantages and disadvantages. Nevertheless, current telecommunication systems do not enable a user to automatically join or seamlessly switch between communication modes based on the user's content request and/or profile.

SUMMARY OF THE INVENTION

Accordingly, it is an object of the invention to provide a system and method in which users may join a communication mode such that the multimedia content received by the user is closely matched to a predefined profile. The content may be transmitted by unicast, multicast (or simulcast) or radio broadcast. Moreover, depending on an individual's request(s) and that of other users in a network, a user may switch between a radio broadcast, multicast and unicast to meet the user's preferences based on a profile. Profile data may include content type, transmission quality, cost considerations, etc. The two-way nature of the system and method also enable a user to request and receive information and complete transactions.

BRIEF DESCRIPTION OF THE DRAWINGS

The foregoing features and other aspects of the invention are explained in the following description taken in conjunction with the accompanying figures wherein:

FIG. 4 illustrates the process of classifying users according to their profile according to one embodiment of the invention;

FIG. 5 illustrates the process of requesting information and/or completing a transaction according to one embodiment of the invention.

It is to be understood that the drawings are for illustration only and are not limiting.

DETAILED DESCRIPTION OF THE INVENTION

Traditional communication modes have been one-to-one or unicast, and one-to-all or broadcast. Between the extremes lies what is called multicast (or simulcast), the targeting of a single message or data stream to a select set of receivers. Each of these modes of communications have their own advantages and disadvantages. For example, a unicast may provide for transmission with more consistent quality than a multicast where the number of users fluctuates. However, a multicast conserves resources when one transmission is being sent to multiple users. Further, radio frequency (RF) transmissions effectively allows communication to a large number of users. Nevertheless, the regulation of such transmissions prevent a large number of transmissions serving a small number of users. Accordingly, the invention as described below allows users to take advantage of these modes of communication by allowing dynamic switching among unicasts, multicasts and RF broadcasts.

The invention is particularly suited to continuous packet based communication sessions (such as UDP/IP streaming multi-media using a TCP/IP control session) to a mobile unit, where the mobile unit is seeking content as part of a unicast or multicast. Examples of the continuous packet based communication sessions that are particularly assisted by the instant invention include streaming multi-media and Internet Protocol (IP) telephony. The wireless system described herein may be operated in accordance with one or more standards, including, but not limited to, global system for mobile communications (GSM), code division multiple access (CDMA), time division multiple access (TDMA), enhanced data rates for global evolution (EDGE) and general packet radio service (GPRS). Finally, the invention enables mobile units to access RF broadcast content when the data sought is available in such medium and where such transmission is most efficient.

The System

Figure 1A:
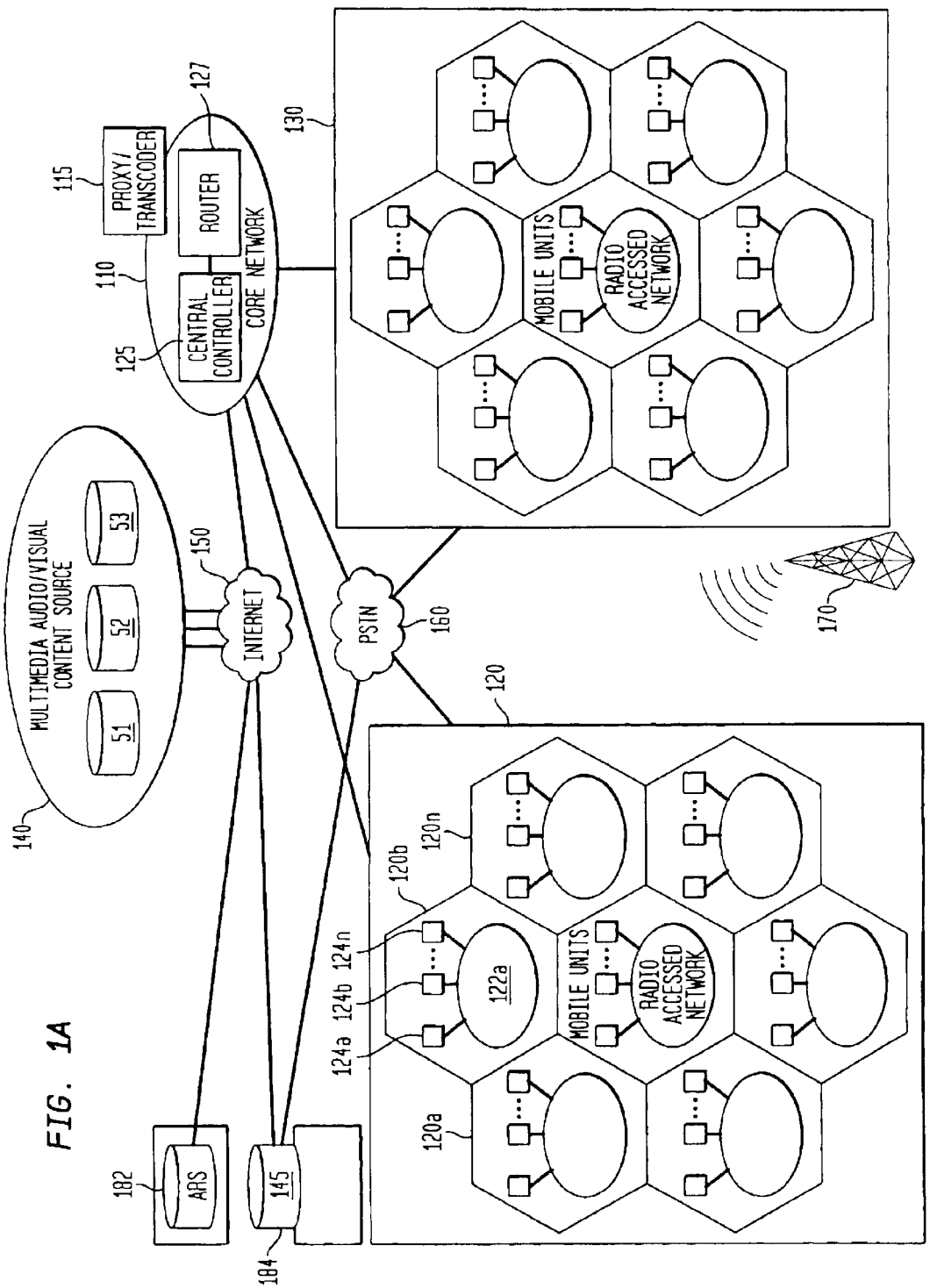
FIG. 1A illustrates a network for supporting transmission of a unicast/multicast/broadcast to users according to one embodiment of the present invention.

FIG. 1A illustrates a network for supporting transmission of a unicasts, multicasts and RF broadcasts to users according to one embodiment of the present invention. The system includes cellular networks 120 and 130, which further includes a plurality of radio accessed networks 122 each in a cellular zone 120. Each radio accessed network 122 is operable with a plurality of mobile units 124 over radio frequency links between the radio accessed network 122 and the mobile units 124. In one embodiment, mobile unit 124 may be a wireless telephone. In alternate embodiments, mobile unit 124 may be any wireless communication device including computers, pagers, PDAs, and the like.

Though not illustrated, cellular networks 120, 130 also include other elements of a wireless or cellular network, including location registers, control circuitry, switching circuitry, etc. Accordingly, certain aspects of the architecture of the cellular system, including known functions and operation of radio accessed networks 122, mobile stations and cellular switching centers conform to analog and digital cellular architectures that are deployed in the United States and foreign countries. As these standards and architectures are constantly evolving, they are not here specifically described.

The cellular networks 120, 130 are connected and therefore part of a wide area network, such as core network 110. Core network 110 may also include a proxy/transcoder 115. Proxy/Transcoder 115 provides proxy services for mobile units 124 in some embodiments of the invention. For example, the proxy/transcoder 115 can be used to make the transfer of data more suitable for transmission over the core network (i.e., to enhance the user perceived quality). The specific functions can include: (i) rate adaptation and adding resilience features on a session by session basis, or within a session; (ii) prioritizing the streaming packets, and possibly assigning these packets to different sub-flows; and (iii) shuffling the transmission order of the packets to facilitate receiver-based error mitigation.

Cellular networks 120, 130 are also connected to the public switched telephone network (PSTN) 112 and the internet 150. This system links wireless communications between mobile units 120 and other users connected to the PSTN and/or internet. In one embodiment, connection between the cellular networks 120, 130 and the PSTN 112 and the internet 150 is a direct connection. In an alternate embodiment, the cellular networks 120, 130 are connected to the PSTN 112 and the internet 150 through the core network 110.

Connected to the internet are content sources (servers) 140. In one embodiment, content sources may include content servers S1, S2 and S3. The content may be audio, video, data or any other type of multimedia content. It should be noted that parts of the system, including servers 140, may include assorted computers with processors, memory, and storage capability, both volatile and non-volatile. These computers function using computer code that is loaded from storage into a memory and thereby serve as instructions for the processor. As will be described more fully below, servers 140 are capable of receiving requests and sending content through the networks 110, 120, 130, 150, 160 to mobile units 124.

Connected to the internet 150 and the PSTN 160 are one or more interactive voice response units (or IVR server) 184 which enable a user to access content or effectuate transactions by transmitting tones or speech over the network to, for example, servers 140. Three alternative ways for consumer 134 to transmit this information to central controller 125 include (1) telephoning live operators at central controller 125, to verbally provide information which is entered into the system via operator terminals; (2) telephone answering services at central controller 125 that provide programmed responses based on information received from each consumer; and (3) browsing a text based graphical user interface which allows a user to select desired content through such interface. In an alternate embodiment a user may input a request by pressing keys on a communication device. For example, a user may enter a key sequence '#' 'F' 'M' '1' '0' '1' '9' which means "I want to listen to the FM radio station 101.9." In yet another embodiment, a user may request data using a natural language search (i.e., typing "I really like Jazz and artists like the Beatles, but I do not like opera." Instead of the web, a voice means may be used to enter the user's natural language request.

Also, connected to the internet is application proxy server 182 which controls the communication of content transmissions and content requests through the networks, and to and from the mobile units 124.

In addition to receiving content through the internet and/or the PSTN, content may be transmitted by radio frequency (RF) antenna 170. For example, an RF broadcast may be transmitted by antenna 170, converted to an audio signal, to a mobile user 124.

In one embodiment, core network 110 may contain a central controller 125 configured to receive information from one or more users, transmit content to the users, classify users according to a predetermined profile, and handle the joining, leaving and switching among communication modes by users. Central controller 125 preferably comprises a processor-based system that maintains databases and information relating to the transmission of content accessed from source 140 in response to users' requests and users' profiles.

Central controller 125 may store information relating to the establishment of unicasts, multicasts and/or broadcasts, information relating to the transmission of content over these communication modes, as well as information relating to a user's profile. As will be described more fully below, processing of such data enables central controller 125 to determine the appropriate communication mode based on the content requested by a user and the user's profile. The structure of one embodiment of central controller 125 is described below with respect to FIG. 1B. In one embodiment, router 127, which is in communication with central controller 125, enables the system to switch transmission from one network (i.e., PSTN, internet, RF network) to another.

Users may include one or more individuals or equipment utilized by individual(s) that may access content stored in multimedia audio/visual content sources 140. In addition to accessing content, users may update profiles and complete transactions using the system as illustrated in FIG. 1A. These activities will be described more fully below.

Figure 1B:
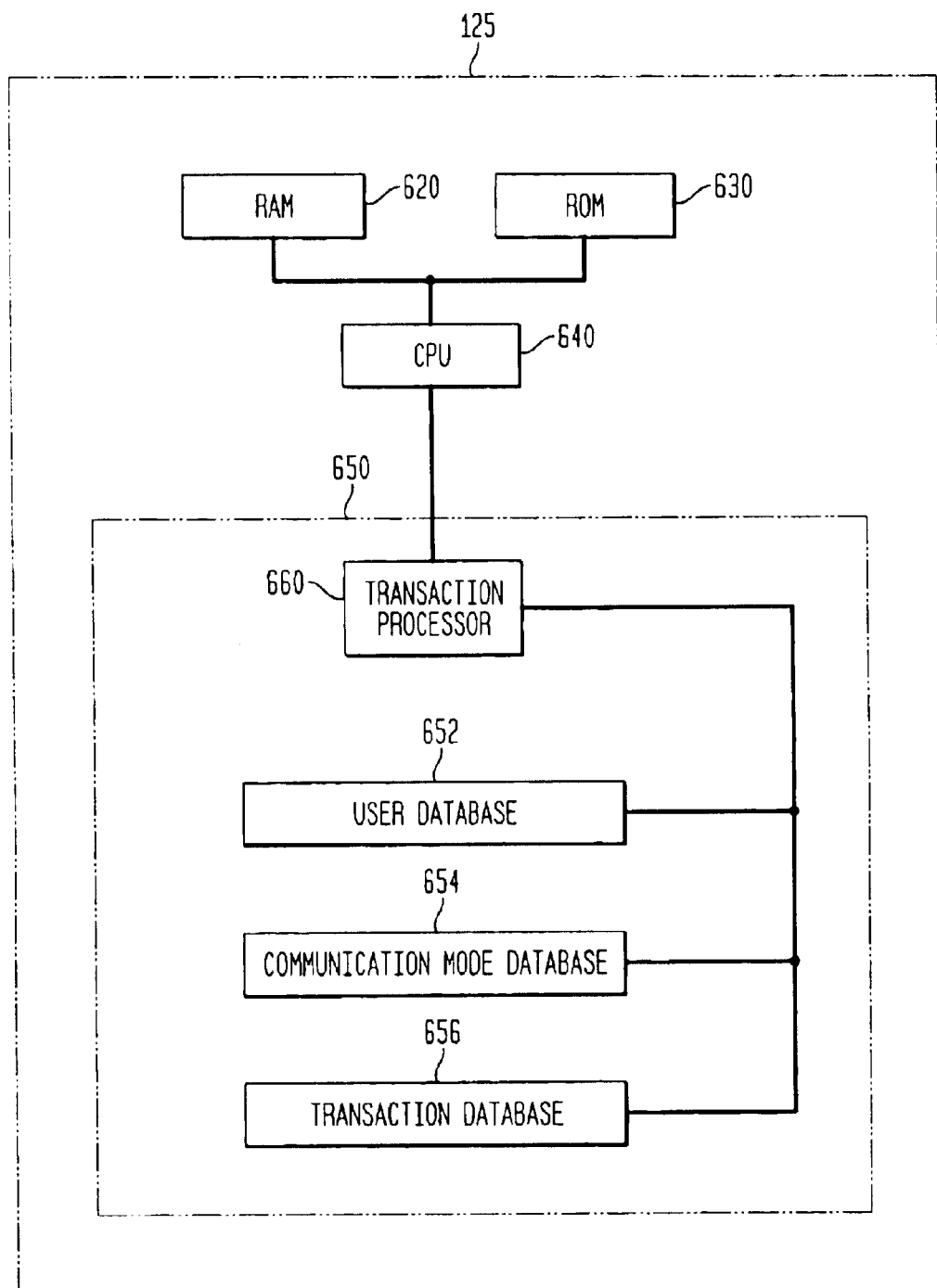
FIG. 1B illustrates one embodiment of the central controller used in the system shown in FIG. 1A.

FIG. 1B illustrates one embodiment of the central controller 125 for a system according to the present invention.

As shown in FIG. 1B, central controller 125 includes central processing unit (CPU) 640, random access memory (RAM) 620, read-only memory (ROM) 630, and large capacity storage device 650. CPU 640, preferably comprising a conventional microprocessor such as an Intel Pentium Processor, is electronically coupled to each of the central controller's 125 other elements.

CPU 640 executes program code stored in one or more of RAM 620, ROM 630 and storage device 650 to carry out the functions and acts described in connection with central controller 125. CPU 640 preferably comprises at least one high-speed digital data processor adequate to execute program modules for joining, leaving or switching among communication modes, and/or accessing data or completing transactions via a selected communication mode. These modules are described below in connection with FIGS. 2–5. CPU 640 interacts with RAM 620, ROM 630 and storage device 650 to execute stored program code according to conventional data processing techniques.

Large capacity storage device 650 may contain transaction processor 660, user database 652, communication mode database 654, and transaction database 656. Transaction processor 660 maintains, determines and accesses data stored in databases 652, 654, 656, and prepares user profile, communication mode and transaction information for transmission information to and from users as described in connection with FIGS. 2–5. Transaction processor 660 may comprise a separate, conventional CPU/microprocessor, or a portion of the operating function of CPU 640. User database 652 contains data about users that register with network shown in FIG. 1A. The data is used to enable users to join and leave communication modes, to access multimedia content, and to send or receive data relating to user transactions. Communication mode database 354 contains information and parameters relating to the establishment and control of the communication modes available to users. These modes include unicasts, multicasts or radio broadcasts. Transaction database 656 contains information relating to content information and/or transaction data available to users. Content information and transaction data is described more fully below with respect to FIG. 5.

Joining Communication Modes

Figure 2:
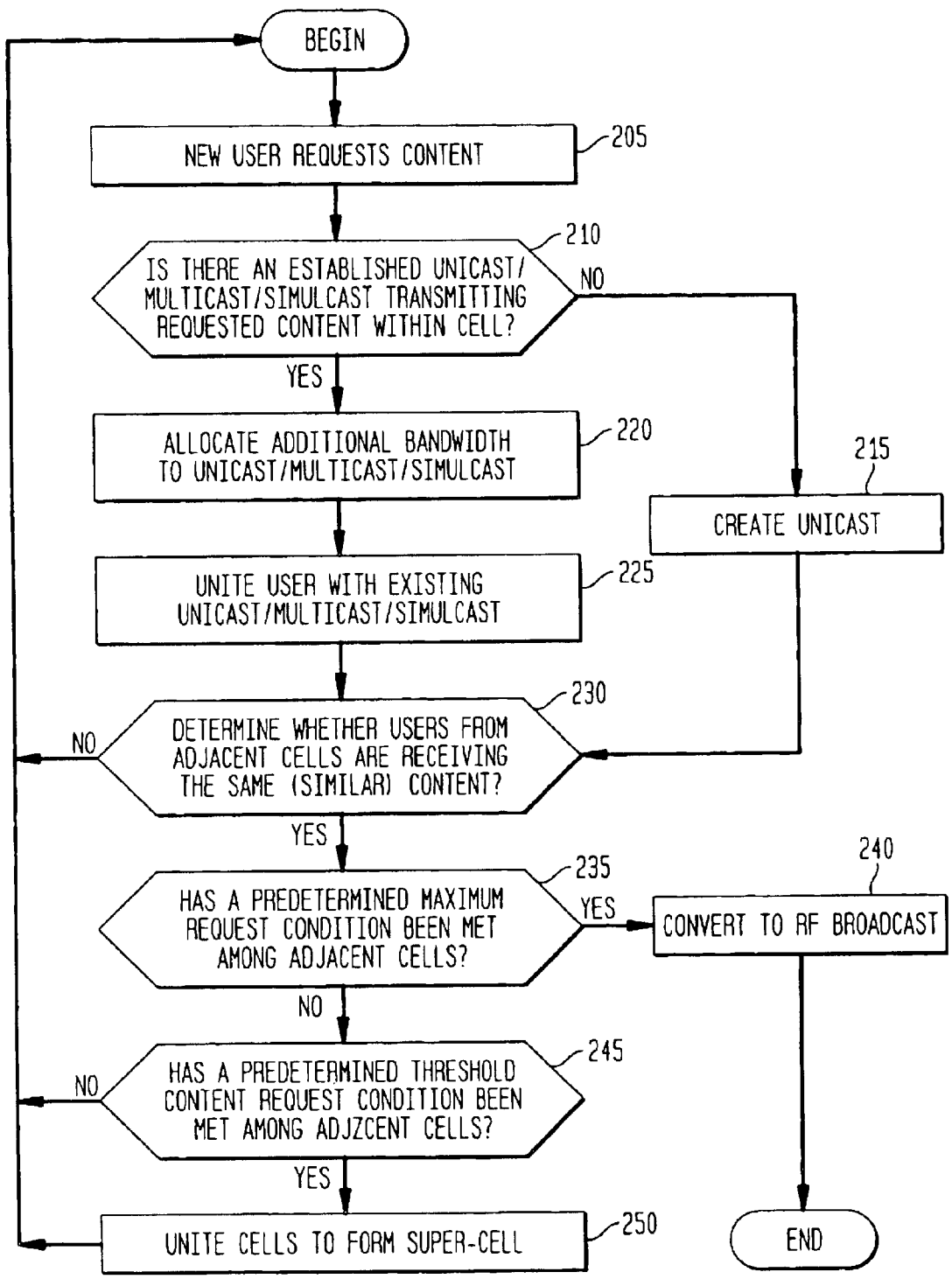
FIG. 2 illustrates the process of joining a unicast/multicast/broadcast according to one embodiment of the invention.

FIG. 2 illustrates the process of establishing or joining a communication mode in accordance to one embodiment of the instant invention. As described above, the communication mode may be a unicast, multicast (or simulcast) or radio broadcast. At step 205, a user of mobile unit 124 may request content that is initially stored in content sources 140. The request may be made, in one embodiment, through the PSTN 160 by utilizing an interactive voice response unit of interactive voice server 184. This may be accomplished by DTMF tones, speech signals or some other signal that may be recognized by the interactive voice response unit. In an alternate embodiment, the request may be made through the internet 150 by the mobile unit 124 or some other user interface in communication with the internet. This may be accomplished, for example, by browsing the internet for the selection of desired content.

At step 210, CPU 640 of central controller 125 determines whether a unicast or multicast session which is hosting the transmission of the requested content has been established within a cell 120. If a unicast or multicast is already established, additional bandwidth is allocated to support content transmission to the new user (step 220) and the user is united with the pre-existing users of the unicast or multicast (step 225). (It should be noted that if there was only one pre-existing user, the pre-existing unicast is converted to a multicast via router 127 at the control of central controller 125).

If at step 210, it is determined that there is no unicast or multicast session which is hosting the transmission of the requested content within a cell 120, a unicast is created at step 215.

Once a new user establishes a unicast or enters a multicast, CPU 640 of central controller 125 determines whether users from adjacent cells are receiving the same or similar content (step 230). This determination may be made by comparing the content requested by the users or by comparing the profiles of users receiving content from a unicast or multicast in adjacent cells 120a . . . n. If no other unicasts or multicasts that host the transmission of same or similar content exist in adjacent cells, the process returns to the beginning in which the core network 110 awaits the request of content by a new user (step 205) or monitors user(s) leaving an established communication mode (see FIG. 3).

If, in step 235, users from adjacent cells 120a . . . n are requesting the same or similar content, CPU 640 of central controller 125 determines whether a predetermined maximum request condition has been met among adjacent cells 120. A maximum request condition may be met when a condition arises in which it becomes more feasible to transmit the requested content via radio broadcast. Such an occurrence may arise, in one embodiment, when demands on bandwidth exceeds a predetermined threshold. In another embodiment, a maximum request condition may be met when the number of users requesting content is so great that the benefits of providing specialized content distribution (i.e., multimedia content, advertising content, public service announcement content) via unicasts or multicasts no longer exists. In other words, the mass distribution offered by radio broadcast satisfies the demands of the large number of users.

If the predetermined maximum request condition has been met among adjacent cells, the established unicasts and/or multicasts are converted to a single radio broadcast by router 127 at the direction of central controller 125 (step 240). Accordingly, the content stored in multimedia content sources 140 are transmitted to mobile units 124 by RF transmitter 170.

If a predetermined maximum request condition has not been met among adjacent cells 120, a determination is made, at step 245, as to whether a predetermined threshold content request condition has been met among adjacent cells. It should be noted that a predetermined threshold content request condition is met when it is desirable to unite two or more adjacent cells 120a . . . n, 130a . . . n to form a multicast within a cellular network 120, 130. As described above, merging one or more existing unicasts or multicasts may be advantageous as additional bandwidth may then be dedicated for transmission of the requested content, subscription fees may be lower as such fees may be shared by a larger number of users, etc. A predetermined threshold content request condition should be distinguished from a predetermined maximum request condition in which in the latter case it is more desirable (and often more feasible) to convert the communication modes to a radio broadcast due the large number of users and/or great bandwidth demands. If, however, a predetermined threshold content request condition has been met among adjacent cells at step 245, central controller 125 unites two or more cells 120a . . . n to form a super-cell. By uniting cells to form a super-cell allows the system to transmit using one frequency, instead of a plurality of frequencies. This may be advantageous as system (resource) efficiency is increased, transmission quality among the boundaries of the cell is increased, etc. It should be noted that a simulcast, instead of a multicast, may be established. A simulcast is similar to a multicast in that more than one receiver is receiving a single message (same content). By establishing a simulcast, however, the same content may be sent to different users at different frequencies. Further, in one embodiment, a simulcast allows different users to receive the same content by accessing a plurality of base stations to transmit the content to a plurality of cells. It should be noted that, depending on system resources as well as desired transmission quality, either a simulcast or multicast may be established and that the use of one of these modes as described herein does not preclude the use of the other as may be desired.

Leaving Communication Modes

Figure 3:
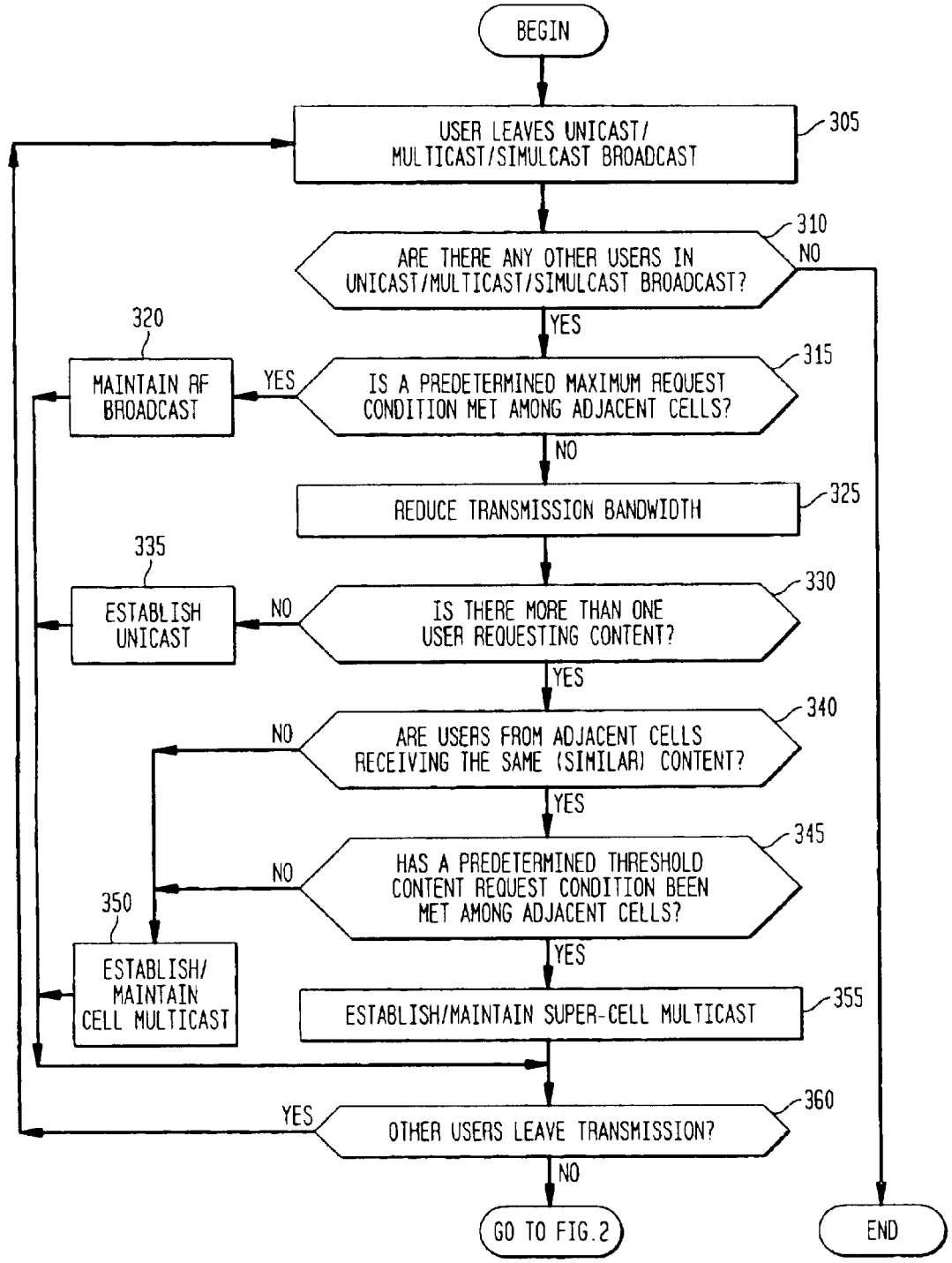
FIG. 3 illustrates the process of leaving a unicast/multicast/broadcast according to one embodiment of the invention.

FIG. 3 illustrates the process wherein one or more users leave a communication mode in accordance to one embodiment of the instant invention. In some instances, the departure of these users may result in the termination of a communication mode.

At step 305 a user leaves an established communication mode. This may be accomplished by logging off the network 110 or in, one embodiment, by turning off a user's mobile unit 124.

At step 310, CPU 640 of central controller 125 determines whether any other users are part of the communication mode in which a user has just left. If no other users are part of the communication (i.e., the only user of a unicast leaves the unicast), the process ends and the network continues to monitor the activities of new users.

If other users remain in an existing communication mode, CPU 640 of central controller 125 determine whether a predetermined maximum request condition is met among adjacent cells (step 315). If such a maximum request condition exists, then the established communication mode is an RF broadcast. Because such condition continues even with the departure of a user, the RF broadcast is maintained (step 320) and the network continues to monitor the system for whether other users are leaving (steps 360 and 305) and/or joining (step 360 and 205) the broadcast.

If, however, no predetermined maximum request condition among cells 120 exist, the departure of one or more users results in the reduction of transmission bandwidth to the remaining mobile units 120a . . . n, at step 325, as well as a determination as to whether there is more than one remaining user requesting the same or similar content within a communication mode and/or adjacent cells 120a . . . n.

If there is only one user remaining in the established communication mode, central controller 125 establishes a unicast (step 335) and the network continues to monitor the system for whether the user is leaving the unicast (steps 360 and 305) and whether other user(s) are joining (step 360 and 205) the unicast (resulting in a switch to a multicast or RF broadcast).

If, however, more than one user is requesting content, the central controller 125 determines, at step 340, whether users from adjacent cells 120 are requesting the same or similar content. If no other users from adjacent cells 120 are requesting such content, the existing multiple users either maintain the multicast if such communication already existed or a multicast is established if an RF broadcast hosted the content transmission prior to the departure of the user(s) (step 350). The network then continues to monitor the system for whether other user(s) are leaving (steps 360 and 305) and/or are joining (step 360 and 205) the multicast.

If, in step 340, other users from adjacent cells 120 are requesting same or similar content, a determination is made by CPU 640 of central controller 125 as to whether a predetermined threshold content request condition has been met among adjacent cells (step 345). If such a condition does not exist, the existing multiple users either maintain the multicast within a cell if such communication already existed or a multicast within a cell is established if an RF broadcast hosted the content transmission prior to the departure of the user(s) (step 350). If, however, a predetermined threshold content request condition is met among two or more of the adjacent cells 120a . . . n, a multicast is established or maintained among the mobile units 124 of the super-cell.

Once the multicast is established and/or maintained, the network then continues to monitor the system for whether any other user(s) are leaving (steps 360 and 305) and/or are joining (step 360 and 205) the multicast.

User Classification

FIG. 4 illustrates the process of classifying users according to a user profile in accordance to one embodiment of the instant invention. The user profile is information that may be stored in a centrally located database such as user database 652 of central controller 125.

User profile information may be any data that facilitates transmission of requested content to a user, enables a user to seamlessly join, leave or switch among communication modes, and effectuate transactions (i.e., purchases, data download, etc.) over the network of FIG. 1. Such information may include personal information such as the user's name, geographic location, interests and hobbies. This information may be used for user identification purposes as well as for advertising and marketing purposes.

User profile information may further include content preference information such as types of audio, video and text information that may be of interest to the user, as well as other preferences including importance of cost versus reliability and speed of delivery when requesting multimedia content. The level of data that may be supplied may vary. For example, when establishing a user's profile for audio content, a user may identify not only the type of music that is most enjoyable but the individual artists that the user most or least prefers. Based on this information and other user profile information, the individuals may be associated with the unicast, multicast or broadcast that most closely meets the parameters identified by the user. In another embodiment, the system may analyze user's preferences and, as a result, infer other preferences of the user. For example, if a user requests Britney Spears, an inference may be made that the user likes similar artists, such as Christina Aguilera. Alternatively, if users indicate that they do not like the singer Paul McCartney, then an inference may be made that they do not like bands in which Paul McCartney is a member—i.e., The Beatles, Wings. An opportunity may be given to the user to confirm or deny these inferences.

Content preferences may relate to billing rates associated with accessing content. In one embodiment, users may be billed for accessing content. The billing may depend on the communication mode accessed. For example, RF broadcasts may be free, whereas unicasts may incur a charge. Multicasts and simulcasts may incur a charge that is less than the charge for a unicast. In yet an alternate embodiment, the level of billing may correspond to the level of content selection that a user has. Therefore, for example, a user who pays no fee can choose to join a communication mode but must be willing to access whatever content is made available. Another user may pay a monthly fee of $50.00 and can request, for example, Jazz/Rock fusion. While another user may pay $1000.00 per month and can, for example, request specific artists every so often.

Transactional information may be stored in the transaction database 656 of central controller 125. This information may include credit card and security code information to effectuate purchases in an established communication mode. For example, if a user wishes to request additional information relating to a song transmitted in a multicast or wishes to purchase a compact disc of the artist who recorded the song, such information may facilitate the transaction. Additional information, such as transaction history allows the multicast to tailor targeted advertising and marketing to its users.

Turning to FIG. 4, user profile information may be received by central controller 125 at step 405. User profile information may be transmitted by a user via a user's mobile unit 124 or any other user interface device that is in communication with the core network 110 directly or indirectly through the internet 150 or PSTN 160. Other interface devices may include e-mail, telephone, facsimile, PCs, etc. In one embodiment, user profile information is stored in user database 652.

Upon receiving this data, the user may then be associated with one or more content-focused unicasts, multicasts or RF broadcasts that are available in the user's geographic region (step 410). In one embodiment, the user is automatically associated with a communication mode when accessing the system in FIG. 1A. In an alternate embodiment, a user may be prompted to select from a menu of one or more available multimedia transmissions meeting the user's profile. In yet another embodiment, a user may be alerted when predetermined parameters relating to designed content is transmitted by an communication mode which is accessible by the user.

Upon being associated with a transmission, the central controller 125 monitors whether the user is leaving the communication mode (step 415). If the user leaves the transmission, the user's profile may be accessed to facilitate associating the user with another transmission. Otherwise, central controller 125 monitors (at a frequency determined by the user or a default frequency) whether other communication modes exist that meets the user's profile information (step 420). CPU 640 may calculate whether a potentially more desirable transmission is available by analyzing the preferences of the user stored in database 652 (step 425).

If a potentially more desirable transmission is available to the user, the user may be switched to the new communication mode. This may be executed in several different ways. In one embodiment, a user may indicate that if specific content (i.e., songs by a specific artist) or a combination of parameters are met (i.e., multicast of country songs from 1980s where the subscription fee is less than a predetermined amount), the communication modes are to be switched immediately to access that transmission. This is called immediate automatic access.

Alternatively, a user may want to switch in a seamless manner to another communication mode when certain parameter(s) are met. This may be accomplished by timing the switching between communication modes by adding content, such as an advertisement, so that the user leaves the first mode and enters the second mode at logical points such that no interruptions are sensed. This mode is called seamless automatic access.

Finally, the user may wish to remain with an existing communication unless the user manually selects to move to another available transmission. Such a selection may be initiated by the user or may be prompted by the system. Such a mode is called manual access.

Depending on the parameters selected by the user and whether the user wishes to switch transmissions when a higher priority is detected with respect to another available communication mode, the user may choose to be associated with another transmission (step 430) or maintain the existing transmission (step 435).

In either case, the system continues to monitor whether the user has left the network. If the use has terminated the session, the process ends. Alternatively, if the user continues to access the network, the process returns to step 415 in which the user's activities as well as the availability of other transmissions are monitored.

Transaction Process

FIG. 5 illustrates the process of requesting information and/or completing transactions in accordance to one embodiment of the instant invention. As described above, a user may wishes to request additional information relating to the multimedia content transmitted by the accessed communication mode or may wish to complete a transaction, such as purchase an item relating to the multimedia content being communicated or an advertisement that is being transmitted. A user may utilize mobile unit 124 or some other interface device in communication with the network of FIG. 1A to effectuate such data download or transaction. In one embodiment, such activity is facilitated by accessing user profile information (i.e., identification information, credit card information, etc.) that may be stored in a centrally located database such as user database 652 of central controller 125. Moreover, transaction database may store additional data required to complete the download and/or transaction. Such information may include description information (of items for sale or requested data), pricing information, delivery time information, related items of potential interest, and the like.

The transaction process begins by accessing a communication mode (step 710) by and receiving multimedia content (step 715). As mentioned above, this user may use a mobile unit 124 or some other user interface device in communication with networks 110, 150 and/or 160 to initiate the call occurrence.

At step 720, central controller 125 determines whether the user is requesting additional data relating to the communication provided by the existing communication mode. If such information is requested, the user may, in one embodiment utilize an interactive voice response unit to request and receive the data (steps 725 and 730). In an alternate embodiment, other means for requesting content may be employed (i.e., via e-mail, worldwide web access, etc.). If the transmission is complete, the process ends. If, however, the user continues to access the transmission, the process returns to step 715.

Returning to step 720, if additional content is not desired, central controller 125 determines whether the user wishes to complete a transaction. If no transaction is requested, the central controller determines whether the transmission is complete (step 760). If the transmission is complete, the process ends. If, however, the user continues to access the transmission, the process returns to step 715.

If, however, at step 735, the user wishes to complete a transaction, the user is connected to a transaction module (step 745) and the required transaction steps (i.e., exchange of pertinent information to complete transaction) are performed (step 750). The user then receives a confirmation that the transaction has executed (step 755).

Once the transaction is completed, central controller 125 determines whether the user wishes to terminate the transmission (step 765). If the transmission is complete, the process ends. If, however, the user continues to access the transmission, the process returns to step 715.

It will be apparent to those skilled in the art that various modifications and variations can be made in the system and processes of the present invention without departing from the spirit or scope of the invention. Thus, it is intended that the present invention cover the modifications and variations of this invention provided they come within the scope of the appended claims and their equivalents. In this context, equivalents means each and every implementation for carrying out the functions recited in the claims, even if not explicitly described herein.

Subscriber Services Examples

Because the systems and methods above enables users to easily move among unicasts, multicasts and broadcasts, users may receive content that is specifically tailored to the user's interests. The example of joining a transmission in which a user can listen to music in response to the specific parameters is explained above. Due to the specific user-tailored content transmission capability of the system, numerous other content communication services may be available. Some of these services include: (1) corporate virtual broadcast networks enabled by users dialing into a corporate broadcast or being called by a corporate broadcast server; (2) audio books transmitted via the above unicast mechanism, indexed to the listener's progress through the book, i.e., transmission resumes at the point that the listener last disconnected form the service; (3) emergency breakthrough services that allow transmission of a radio program but will interrupt that transmission for various reasons specified in a user profile. The reasons can vary from incoming calls from particular users, to changes in the stock market, to weather conditions in a particular area, etc.; (4) specific information, i.e., weather and traffic conditions can be highly specific to a particular listener based upon either profiled information, the current cell site, or a entered geographic code (e.g., an area code and office code). Sensors at a cell site could automatically provide highly specific weather and traffic information; (5) wide area (even international) access to highly localized events, such as local sport events, PTA meeting, town meetings, etc., and allowing the listener to interact with people at these meetings; and (6) archived broadcasts may be accessed and managed through a archive server, allowing listeners to hear missed broadcasts. The services described above is meant to be a representative listing of the offerings that may be facilitated by the systems and methods described above.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

What is claimed is:

1. A method for transmitting content over a network, comprising:
   analyzing user profile data for similarity of said data;
   identifying a number of users within a cell that have similar profile data;
   establishing at least one communication mode, wherein the communication mode is established based on the number of users and the user's profile data of said users;
   uniting an additional user with the communication mode that most closely meets the additional user's profile data; and
   determining whether users from adjacent cells are receiving similar content in response to similar user profile data.

2. The method of claim 1, wherein the communication mode comprises at least one unicast.

3. The method of claim 1, wherein the communication mode comprises at least one multicast.

4. The method of claim 1, wherein the communication mode comprises at least one simulcast.

5. The method of claim 1, wherein the communication mode comprises at least one radio frequency broadcast.

6. The method of claim 1, wherein the profile data comprises content that the user wishes to receive.

7. The method of claim 1, further comprising identifying content that the user wishes to receive by evaluating a natural language request.

8. The method of claim 1, wherein the profile data comprises a preferred range of transmission quality.

9. The method of claim 1, further comprising accessing a fee for access.

10. The method of claim 9, wherein the fee paid by the user influences the content which is transmitted.

11. The method of claim 1, wherein the profile data comprises a preferred range of transmission billing rate for receiving content.

12. The method of claim 1, further comprising informing a user of content that is available.

13. The method of claim 12, wherein the user is informed by a text message.

14. The method of claim 12, wherein the user is informed by an audio message.

15. A method for transmitting content over a network, comprising:
   analyzing user profile data for similarity of said data;
   identifying a number of users within a cell that have similar profile data;
   establishing at least one communication mode, wherein the communication mode is established based on the number of users and the user's profile data of said users;
   uniting an additional user with the communication mode that most closely meets the additional user's profile data;
   determining whether users from adjacent cells are receiving similar content in response to similar user profile data;
   calculating whether the number of said users has met a predetermined threshold content request condition; and
   calculating whether the number of said users has met a maximum request condition.

16. The method of claim 15, further comprising:
   allocating additional bandwidth to the communication mode when the additional user is united with the communication mode.

17. The method of claim 15, wherein the communication mode is converted from a unicast to a multicast or simulcast when the additional user is the second user associated with the communication mode.

18. The method of claim 15, further comprising:
   calculating whether the number of said users has met a predetermined threshold content request condition; and
   calculating whether the number of said users has met a maximum request condition.

19. The method of claim 18, further comprising:
   uniting a plurality of adjacent cells when a predetermined threshold content request condition is met and a predetermined maximum request condition has not been met.

20. The method of claim 18, further comprising:
establishing a radio frequency broadcast when a predetermined maximum request condition has been met.

21. A method for transmitting content over a network, comprising:
analyzing user profile data for similarity of said data;
identifying a number of users within a cell that have similar profile data;
establishing at least one communication mode, wherein the communication mode is established based on the number of users and the user's profile data of said users;
releasing a user from the communication mode; and
determining whether users from adjacent cells are receiving similar content in response to similar user profile data.

22. The method of claim 21, wherein the user is released from the communication mode in response to said user terminating access to said network.

23. The method of claim 21, further comprising:
uniting the released user with another established communication mode in response to the released user's profile data.

24. The method of claim 21, further comprising:
reducing bandwidth from the communication mode when the user is released from said communication mode.

25. The method of claim 21, wherein the communication mode is converted from a multicast to a unicast when releasing a user results in one remaining user in the communication mode.

26. The method of claim 21, further comprising:
calculating whether the number of said users has met a predetermined threshold content request condition; and
calculating whether the number of said users has met a maximum request condition.

27. The method of claim 26, further comprising:
uniting a plurality of adjacent cells when a predetermined threshold content request condition is met and a predetermined maximum request condition has not been met.

28. The method of claim 26, further comprising:
establishing a radio frequency broadcast when a predetermined maximum request condition has been met.

29. The method of claim 26, further comprising:
establishing separate communication modes for each cell when a predetermined threshold content request condition has not been met.

30. A method for transmitting content over a network, comprising:
analyzing user profile data for similarity of said data;
identifying a number of users within a cell that have similar profile data;
establishing at least one communication mode, wherein the communication mode is established based on the number of users and the user's profile data of said users;
switching a user from one communication mode to another communication mode; and
determining whether users from adjacent cells are receiving similar content in response to similar user profile data.

31. The method of claim 30, wherein the user is switched to another communication mode in response to said analysis of said user profile data.

32. The method of claim 30, wherein the user is switched to another communication mode in response to a communication mode selection made by said user.

33. The method of claim 31, wherein the user is switched to another communication mode by immediate automatic access.

34. The method of claim 31, wherein the user is switched to another communication mode by seamless automatic access.

35. A method for transmitting content over a network, comprising:
analyzing user profile data for similarity of said data;
identifying a number of users within a cell that have similar profile data;
establishing at least one communication mode, wherein the communication mode is established based on the number of users and the user's profile data of said users;
transmitting user-specified data to a user; and
determining whether users from adjacent cells are receiving similar content in response to similar user profile data.

36. The method of claim 35, wherein the user-specified data is information relates to the content transmitted to the user.

37. The method according to claim 35, wherein the user-specified information relates to emergency information that may be of interest to the user.

38. The method according to claim 35, wherein the user-specified information relates to marketing information that may be of interest to the user.

39. A method for transmitting content over a network, comprising:
analyzing user profile data for similarity of said data;
identifying a number of users within a cell that have similar profile data;
establishing at least one communication mode, wherein the communication mode is established based on the number of users and the user's profile data of said users;
receiving information for execution of at least one transaction; and
determining whether users from adjacent cells are receiving similar content in response to similar user profile data.

40. The method of claim 39, wherein the executed transaction comprises purchasing a product or service related to the transmitted content.

41. A system for transmitting content over a network, comprising:
a first database for storing said content;
a second database for storing user profile data; and
a processor configured for analyzing said user profile data for similarity of said data, identifying a number of users within a cell that have similar profile data, establishing at least one communication mode, wherein the communication mode is established based on the number of users and the user's profile data of said users, and determining whether users from adjacent cells are receiving similar content in response to similar user profile data.

42. The system of claim 41, wherein the communication mode comprises at least one unicast.

43. The system of claim 41, wherein the communication mode comprises at least one multicast.

44. The system of claim 41, wherein the communication mode comprises at least one simulcast.

45. The system of claim 41, wherein the communication mode comprises at least one radio frequency broadcast.

46. The system of claim 41, wherein the processor is further configured for identifying content that the user wishes to receive by evaluating a natural language request.

47. The system of claim 41, wherein the profile data comprises content that the user wishes to receive.

48. The system of claim 41, further comprising accessing a fee for access.

49. The system of claim 48, wherein the fee paid by the user influences the content which is transmitted.

50. The system of claim 41, wherein the profile data comprises a preferred range of transmission quality.

51. The system of claim 41, further comprising informing a user of content that is available.

52. The system of claim 51, wherein the user is informed by a text message.

53. The system of claim 51, wherein the user is informed by an audio message.

54. The system of claim 41, wherein the profile data comprises a preferred range of transmission billing rate for receiving content.

55. A system for transmitting content over a network, comprising:
   a first database for storing said content;
   a second database for storing user profile data;
   a processor configured for analyzing user profile data for similarity of said data, identifying a number of users within a cell that have similar profile data, determining whether users from adjacent cells are receiving similar content in response to similar user profile data, and establishing at least one communication mode, wherein the communication mode is established based on the number of users and the user's profile data of said users; and
   a router configured for uniting an additional user with the communication mode that most closely meets the additional user's profile data.

56. The system of claim 55, wherein the processor is further configured for allocating additional bandwidth to the communication mode when the additional user is united with the communication mode.

57. The system of claim 55, wherein the router further converts the communication mode from a unicast to a multicast when the additional user is a second user associated with the communication mode.

58. The system of claim 55, wherein the processor is further configured for calculating whether the number of said users has met a predetermined threshold content request condition, and calculating whether the number of said users has met a maximum request condition.

59. The system of claim 58, wherein the router is further configured for uniting a plurality of adjacent cells when a predetermined threshold content request condition is met and a predetermined maximum request condition has not been met.

60. The system of claim 55, wherein the processor is further configured for establishing a radio frequency broadcast when a predetermined maximum request condition has been met.

61. A system for transmitting content over a network, comprising:
   a first database for storing said content;
   a second database for storing user profile data; and
   a processor configured for analyzing user profile data for similarity of said data, identifying a number of users within a cell that have similar profile data, releasing a user from the communication mode, determining whether users from adjacent cells are receiving similar content in response to similar user profile data, releasing a user from the communication mode, and establishing at least one communication mode, wherein the communication mode is established based on the number of users and the user's profile data of said users.

62. The system of claim 61, wherein the user is released from the communication mode in response to said user terminating access to said network.

63. The system of claim 61, further comprising:
   a router configured for uniting the released user with another established communication mode in response to the released user's profile data.

64. The system of claim 61, wherein the processor is further configured for reducing bandwidth from the communication mode when the user is released from said communication mode.

65. The system of claim 61, wherein the router is further configured for converting the communication mode from a multicast to a unicast when releasing a user results in one remaining user in the communication mode.

66. The system of claim 61, wherein the processor is further configured for calculating whether the number of said users has met a predetermined threshold content request condition, and calculating whether the number of said users has met a maximum request condition.

67. The system of claim 66, further comprising:
   a router configured for uniting a plurality of adjacent cells when a predetermined threshold content request condition is met and a predetermined maximum request condition has not been met.

68. The system of claim 66, wherein the processor is further configured for establishing a radio frequency broadcast when a predetermined maximum request condition has been met.

69. The system of claim 66, wherein the processor is further configured for establishing a separate communication modes for each cell when a predetermined threshold content request condition has not been met.

70. A system for transmitting content over a network, comprising:
   a first database for storing said content;
   a second database for storing user profile data;
   a processor configured for analyzing user profile data for similarity of said data, identifying a number of users within a cell that have similar profile data, determining whether users from adjacent cells are receiving similar content in response to similar user profile data, and establishing at least one communication mode, wherein the communication mode is established based on the number of users and the user's profile data of said users; and
   a router configured for switching a user from one communication mode to another communication mode.

71. The system of claim 70, wherein the router is configured for switching the user to another communication mode in response to said analysis of said user profile data.

72. The system of claim 70, wherein the router is configured for switching the user to another communication mode in response to a communication mode selection made by said user.

73. The system of claim 71, wherein the router is configured for switching the user to another communication mode by immediate automatic access.

74. The system of claim 71, wherein the router is configured for switching the user to another communication mode by seamless automatic access.

75. A system for transmitting content over a network, comprising:

a first database for storing said content;

a second database for storing user profile data;

a processor configured for analyzing user profile data for similarity of said data, identifying a number of users within a cell that have similar profile data, determining whether users from adjacent cells are receiving similar content in response to similar user profile data, and establishing at least one communication mode, wherein the communication mode is established based on the number of users and the user's profile data of said users; and a router configured for directing user-specified data to a user.

76. The system of claim 75, wherein the user-specified data is information relates to the content transmitted to the user.

77. The system according to claim 75, wherein the user-specified information relates to emergency information that may be of interest to the user.

78. The system according to claim 75, wherein the user-specified information relates to marketing information that may be of interest to the user.

79. A system for transmitting content over a network, comprising:

a first database for storing said content;

a second database for storing user profile data; and a processor configured for analyzing user profile data for similarity of said data, identifying a number of users within a cell that have similar profile data, determining whether users from adjacent cells are receiving similar content in response to similar user profile data, and establishing at least one communication mode, wherein the communication mode is established based on the number of users and the user's profile data of said users and receiving information for execution of at least one transaction.

80. The system of claim 79, wherein the executed transaction comprises purchasing a product or service related to the transmitted content.

81. A system for transmitting content over a network, comprising:

means for analyzing user profile data for similarity of said data;

means for identifying a number of users within a cell that have similar profile data;

means for determining whether users from adjacent cells are receiving similar content in response to similar user profile data; and means for establishing at least one communication mode, wherein the communication mode is established based on the number of users and the user's profile data of said users.

82. The system of claim 81, wherein the communication mode comprises at least one unicast.

83. The system of claim 81, wherein the communication mode comprises at least one multicast.

84. The system of claim 81, wherein the communication mode comprises at least one simulcast.

85. The system of claim 81, wherein the communication mode comprises at least one radio frequency broadcast.

86. The system of claim 81, wherein the profile data comprises content that the user wishes to receive.

87. The system of claim 81, further comprising means for identifying content that the user wishes to receive by evaluating a natural language request.

88. The system of claim 81, wherein the profile data comprises a preferred range of transmission quality.

89. The system of claim 81, further comprising means for accessing a fee for access.

90. The method of claim 89, wherein the fee paid by the user influences the content which is transmitted.

91. The system of claim 81, wherein the profile data comprises a preferred range of transmission billing rate for receiving content.

92. The method of claim 81, further comprising informing a user of content that is available.

93. The method of claim 92, wherein the user is informed by a text message.

94. The method of claim 92, wherein the user is informed by an audio message.

95. A system for transmitting content over a network, comprising:

means for analyzing user profile data for similarity of said data;

means for identifying a number of users within a cell that have similar profile data;

means for establishing at least one communication mode, wherein the communication mode is established based on the number of users and the user's profile data of said users;

means for determining whether users from adjacent cells are receiving similar content in response to similar user profile data; and means for uniting an additional user with the communication mode that most closely meets the additional user's profile data.

96. The system of claim 95, further comprising:

means for allocating additional bandwidth to the communication mode when the additional user is united with the communication mode.

97. The system of claim 95, wherein the communication mode is converted from a unicast to a multicast when the additional user is the second user associated with the communication mode.

98. The system of claim 95, further comprising:

means for calculating whether the number of said users has met a predetermined threshold content request condition; and means for calculating whether the number of said users has met a maximum request condition.

99. The system of claim 98, further comprising:

means for uniting a plurality of adjacent cells when a predetermined threshold content request condition is met and a predetermined maximum request condition has not been met.

100. The system of claim 98, further comprising:

means for establishing a radio frequency broadcast when a predetermined maximum request condition has been met.

101. A system for transmitting content over a network, comprising:

means for analyzing user profile data for similarity of said data;

means for identifying a number of users within a cell that have similar profile data;

means for determining whether users from adjacent cells are receiving similar content in response to similar user profile data;

means for establishing at least one communication mode, wherein the communication mode is established based on the number of users and the user's profile data of said users; and means for releasing a user from the communication mode.

102. The system of claim 101, wherein the user is released from the communication mode in response to said user terminating access to said network.

103. The system of claim 101, further comprising:
means for uniting the released user with another established communication mode in response to the released user's profile data.

104. The system of claim 101, further comprising:
means for reducing bandwidth from the communication mode when the user is released from said communication mode.

105. The system of claim 101, wherein the communication mode is converted from a multicast to a unicast when releasing a user results in one remaining user in the communication mode.

106. The system of claim 101, further comprising:
means for calculating whether the number of said users has met a predetermined threshold content request condition; and
means for calculating whether the number of said users has met a maximum request condition.

107. The system of claim 106, further comprising:
means for uniting a plurality of adjacent cells when a predetermined threshold content request condition is met and a predetermined maximum request condition has not been met.

108. The system of claim 106, further comprising:
means for establishing a radio frequency broadcast when a predetermined maximum request condition has been met.

109. The system of claim 106, further comprising:
means for establishing separate communication modes for each cell when a predetermined threshold content request condition has not been met.

110. A system for transmitting content over a network, comprising:
means for analyzing user profile data for similarity of said data;
means for identifying a number of users within a cell that have similar profile data;
means for determining whether users from adjacent cells are receiving similar content in response to similar user profile data;
means for establishing at least one communication mode, wherein the communication mode is established based on the number of users and the user's profile data of said users; and
means for switching a user from one communication mode to another communication mode.

111. The system of claim 110, wherein the user is switched to another communication mode in response to said analysis of said user profile data.

112. The system of claim 110, wherein the user is switched to another communication mode in response to a communication mode selection made by said user.

113. The system of claim 111, wherein the user is switched to another communication mode by immediate automatic access.

114. The system of claim 111, wherein the user is switched to another communication mode by seamless automatic access.

115. A system for transmitting content over a network, comprising:
means for analyzing user profile data for similarity of said data;
means for identifying a number of users within a cell that have similar profile data;
means for determining whether users from adjacent cells are receiving similar content in response to similar user profile data;
means for establishing at least one communication mode, wherein the communication mode is established based on the number of users and the user's profile data of said users; and
means for transmitting user-specified data to a user.

116. The system of claim 115, wherein the user-specified data is information relates to the content transmitted to the user.

117. The system according to claim 115, wherein the user-specified information relates to emergency information that may be of interest to the user.

118. The system according to claim 115, wherein the user-specified information relates to marketing information that may be of interest to the user.

119. A system for transmitting content over a network, comprising:
means for analyzing user profile data for similarity of said data;
means for identifying a number of users within a cell that have similar profile data;
means for determining whether users from adjacent cells are receiving similar content in response to similar user profile data;
means for establishing at least one communication mode, wherein the communication mode is established based on the number of users and the user's profile data of said users; and
means for receiving information for execution of at least one transaction.

120. The system of claim 119, wherein the executed transaction comprises purchasing a product or service related to the transmitted content.

121. Computer executable software code stored on a computer readable medium, the code for transmitting content over a network, comprising:
code to analyze user profile data for similarity of said data;
code to identify a number of users within a cell that have similar profile data;
code to determine whether users from adjacent cells are receiving similar content in response to similar user profile data; and
code to establish at least one communication mode, wherein the communication mode is established based on the number of users and the user's profile data of said users.

122. Computer executable software code stored on a computer readable medium, the code for transmitting content over a network, comprising:
code to analyze user profile data for similarity of said data;
code to identify a number of users within a cell that have similar profile data;

code to determine whether users from adjacent cells are receiving similar content in response to similar user profile data;

code to establish at least one communication mode, wherein the communication mode is established based on the number of users and the user's profile data of said users; and code to unite an additional user with the communication mode that most closely meets the additional user's profile data.

123. The computer executable software code of claim 122, further comprising:

code to calculate whether the number of said users has met a predetermined threshold content request condition; and code to calculate whether the number of said users has met a maximum request condition.

124. The computer executable code of claim 123, further comprising:

code to unite a plurality of adjacent cells when a predetermined threshold content request condition is met and a predetermined maximum request condition has not been met.

125. Computer executable software code stored on a computer readable medium, the code for transmitting content over a network, comprising:

code to analyze user profile data for similarity of said data;

code to identify a number of users within a cell that have similar profile data;

code to determine whether users from adjacent cells are receiving similar content in response to similar user profile data;

code to establish at least one communication mode, wherein the communication mode is established based on the number of users and the user's profile data of said users; and code to release a user from the communication mode.

126. The computer executable software code of claim 125, further comprising:

code to calculate whether the number of said users has met a predetermined threshold content request condition; and code to calculate whether the number of said users has met a maximum request condition.

127. The computer executable software code of claim 126, further comprising:

code to unite a plurality of adjacent cells when a predetermined threshold content request condition is met and a predetermined maximum request condition has not been met.

128. The computer executable software code of claim 126, further comprising:

code to establishing a radio frequency broadcast when a predetermined maximum request condition has been met.

129. The computer executable software code of claim 126, further comprising: establishing separate communication modes for each cell when a predetermined threshold content request condition has not been met.

130. Computer executable software code stored on a computer readable medium, the code for transmitting content over a network, comprising:

code to analyze user profile data for similarity of said data;

code to identify a number of users within a cell that have similar profile data;

code to determine whether users from adjacent cells are receiving similar content in response to similar user profile data;

code to establish at least one communication mode, wherein the communication mode is established based on the number of users and the user's profile data of said users; and code to switch a user from one communication mode to another communication mode.

131. A computer readable medium having computer executable software code stored thereon, the code for transmitting content over a network, the code comprising:

code to analyze to user profile data for similarity of said data;

code to identify to a number of users within a cell that have similar profile data;

code to determine whether users from adjacent cells are receiving similar content in response to similar user profile data; and code to establish at least one communication mode, wherein the communication mode is established based on the number of users and the user's profile data of said users.

132. A computer readable medium having computer executable software code stored thereon, the code for transmitting content over a network, the code comprising:

code to analyze user profile data for similarity of said data;

code to identify a number of users within a cell that have similar profile data;

code to determine whether users from adjacent cells are receiving similar content in response to similar user profile data;

code to establish at least one communication mode, wherein the communication mode is established based on the number of users and the user's profile data of said users; and code to unite an additional user with the communication mode that most closely meets the additional user's profile data.

133. The computer readable medium of claim 132, further comprising:

code to calculate whether the number of said users has met a predetermined threshold content request condition; and code to calculate whether the number of said users has met a maximum request condition.

134. The computer readable medium claim 133, further comprising:

code to unite a plurality of adjacent cells when a predetermined threshold content request condition is met and a predetermined maximum request condition has not been met.

135. A computer readable medium having computer executable software code stored thereon, the code for transmitting content over a network, the code comprising:

code to analyze user profile data for similarity of said data;

code to identify a number of users within a cell that have similar profile data;

code to determine whether users from adjacent cells are receiving similar content in response to similar user profile data;

code to establish at least one communication mode, wherein the communication mode is established based on the number of users and the user's profile data of said users; and code to release a user from the communication mode.

136. The computer readable medium of claim 135, further comprising:

code to calculate whether the number of said users has met a predetermined threshold content request condition; and code to calculate whether the number of said users has met a maximum request condition.

137. The computer readable medium of claim 136, further comprising:

code to unite a plurality of adjacent cells when a predetermined threshold content request condition is met and a predetermined maximum request condition has not been met.

138. The computer readable medium of claim 136, further comprising:

code to establish a radio frequency broadcast when a predetermined maximum request condition has been met.

139. The computer readable medium of claim 136, further comprising:

code to establish separate communication modes for each cell when a predetermined threshold content request condition has not been met.

140. A computer readable medium having computer executable software code stored thereon, the code for transmitting content over a network, the code comprising:

code to analyze user profile data for similarity of said data;

code to identify a number of users within a cell that have similar profile data;

code to determine whether users from adjacent cells are receiving similar content in response to similar user profile data;

code to establish at least one communication mode, wherein the communication mode is established based on the number of users and the user's profile data of said users; and code to switch a user from one communication mode to another communication mode.

141. A programmed computer for transmitting content over a network, comprising:

a memory having at least one region for storing executable program code; and a processor for executing the program code stored in the memory, wherein the program code includes:

code to analyze user profile data for similarity of said data;

code to identify a number of users within a cell that have similar profile data;

code to determine whether users from adjacent cells are receiving similar content in response to similar user profile data; and code to establish at least one communication mode, wherein the communication mode is established based on the number of users and the user's profile data of said users.

142. A programmed computer for transmitting content over a network, comprising:

a memory having at least one region for storing executable program code; and a processor for executing the program code stored in the memory, wherein the program code includes:

code to analyze user profile data for similarity of said data;

code to identify a number of users within a cell that have similar profile data;

code to determine whether users from adjacent cells are receiving similar content in response to similar user profile data;

code to establish at least one communication mode, wherein the communication mode is established based on the number of users and the user's profile data of said users; and code to unite an additional user with the communication mode that most closely meets the additional user's profile data.

143. The programmed computer of claim 142, further comprising:

code to calculate whether the number of said users has met a predetermined threshold content request condition; and code to calculate whether the number of said users has met a maximum request condition.

144. The programmed computer of claim 143, further comprising:

code to unite a plurality of adjacent cells when a predetermined threshold content request condition is met and a predetermined maximum request condition has not been met.

145. A programmed computer for transmitting content over a network, comprising:

a memory having at least one region for storing executable program code; and a processor for executing the program code stored in the memory, wherein the program code includes:

code to analyze user profile data for similarity of said data;

code to identify a number of users within a cell that have similar profile data;

code to determine whether users from adjacent cells are receiving similar content in response to similar user profile data;

code to establish at least one communication mode, wherein the communication mode is established based on the number of users and the user's profile data of said users; and code to release a user from the communication mode.

146. The programmed computer of claim 145, further comprising:

code to calculate whether the number of said users has met a predetermined threshold content request condition; and code to calculate whether the number of said users has met a maximum request condition.

147. The programmed computer of claim 146, further comprising:

code to unite a plurality of adjacent cells when a predetermined threshold content request condition is met and a predetermined maximum request condition has not been met.

148. The programmed computer of claim 146, further comprising:

code to establish a radio frequency broadcast when a predetermined maximum request condition has been met.

149. The programmed computer of claim 146, further comprising:
   code to establish separate communication modes for each cell when a predetermined threshold content request condition has not been met.

150. A programmed computer for transmitting content over a network, comprising:
   a memory having at least one region for storing executable program code; and
   a processor for executing the program code stored in the memory, wherein the program code includes:
      code to analyze user profile data for similarity of said data;
      code to identify a number of users within a cell that have similar profile data;
      code to determine whether users from adjacent cells are receiving similar content in response to similar user profile data;
      code to establish at least one communication mode, wherein the communication mode is established based on the number of users and the user's profile data of said users; and
      code to switch a user from one communication mode to another communication mode.

* * * * *